United States Patent
Abe et al.

(10) Patent No.: US 9,244,714 B2
(45) Date of Patent: Jan. 26, 2016

(54) COMPUTER SYSTEM AND VIRTUAL MACHINE ARRANGING METHOD

(71) Applicant: FUJITSU LIMITED, Kawasaki-shi, Kanagawa (JP)

(72) Inventors: Hideki Abe, Isehara (JP); Sachio Kobayashi, Sagamihara (JP); Hiroki Kobayashi, Kawasaki (JP); Masayoshi Hashima, Kawasaki (JP); Tomotake Sasaki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 18 days.

(21) Appl. No.: 14/451,972

(22) Filed: Aug. 5, 2014

(65) Prior Publication Data
US 2014/0344812 A1 Nov. 20, 2014

Related U.S. Application Data

(63) Continuation of application No. PCT/JP2012/054004, filed on Feb. 20, 2012.

(51) Int. Cl.
*G06F 9/455* (2006.01)
*G06F 9/50* (2006.01)

(52) U.S. Cl.
CPC .......... *G06F 9/45537* (2013.01); *G06F 9/5094* (2013.01); *Y02B 60/142* (2013.01)

(58) Field of Classification Search
CPC .................................................. G06F 9/45533
USPC .......................................................... 718/1
See application file for complete search history.

(56) References Cited

U.S. PATENT DOCUMENTS

| 2011/0176275 | A1 | 7/2011 | Sato |
| 2011/0202640 | A1* | 8/2011 | Pillutla ................. G06F 9/5077 709/221 |

(Continued)

FOREIGN PATENT DOCUMENTS

| JP | 2007-188164 A | 7/2007 |
| JP | 2009-245362 A | 10/2009 |
| JP | 2010-271883 A | 12/2010 |

(Continued)

OTHER PUBLICATIONS

International Search Report issued in PCT/JP2012/054004, mailed Apr. 11, 2012, 2 pages.

(Continued)

*Primary Examiner* — Andy Ho
(74) *Attorney, Agent, or Firm* — Arent Fox LLP

(57) ABSTRACT

A computer system includes servers having virtual machines arranged therein; a noise source in each among the servers, the noise source emitting sound when the server is operated; and a controller that controls arrangement of the virtual machines in the servers. The controller solves an integer programming problem having an objective function representing a noise contribution described as any one among a function of virtual machine arrangement and a function of a job assignment count and indicating an extent of contribution of the sound emitted from the noise source to a noise volume at an evaluation point, by executing software for solving the integer programming problem on a processor, and based on a solution to the integer programming problem, causes the processor to arrange the virtual machines in the servers via an interface for the servers.

7 Claims, 12 Drawing Sheets

(56) References Cited

U.S. PATENT DOCUMENTS

2013/0111492 A1* 5/2013 Nojiri .................. G06F 1/206
                                                                                                               718/104
2014/0047444 A1* 2/2014 Yamaguchi ........... G06F 9/5077
                                                                                                               718/1

FOREIGN PATENT DOCUMENTS

| JP | 2011-151131 A | 8/2011 |
|---|---|---|
| JP | 2011-216134 A | 10/2011 |

OTHER PUBLICATIONS

Takefusa et al., "Virtual Machine Packing Algorithms for Electric Power Saving," IEICE Technical Report, Jul. 21, 2011, vol. 111, No. 163, pp. 73-78.

* cited by examiner

FIG.3
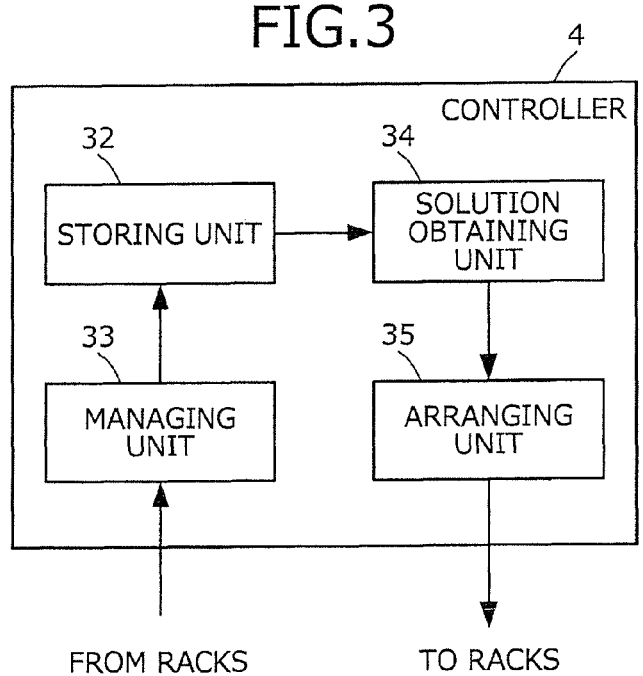
FIG.4
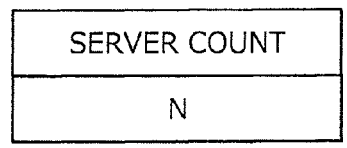
FIG.5
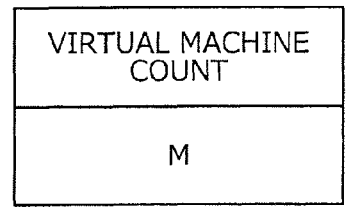
FIG.6
| NUMBER | MAXIMUM VIRTUAL MACHINE COUNT |
|---|---|
| 1 | $L_1$ |
| ⋮ | ⋮ |
| N | $L_N$ |

FIG.7

| NUMBER | NOISE PROPAGATION ATTENUATION CONSTANT |
|---|---|
| 1 | $C_1$ |
| ⋮ | ⋮ |
| N | $C_N$ |

FIG.8

| NUMBER | NOISE SOURCE ACOUSTIC POWER |
|---|---|
| 1 | $\lambda_1$ |
| ⋮ | ⋮ |
| N | $\lambda_N$ |

FIG.9

| NUMBER | BASE NOISE SOURCE ACOUSTIC POWER |
|---|---|
| 1 | $K_1$ |
| ⋮ | ⋮ |
| N | $K_N$ |

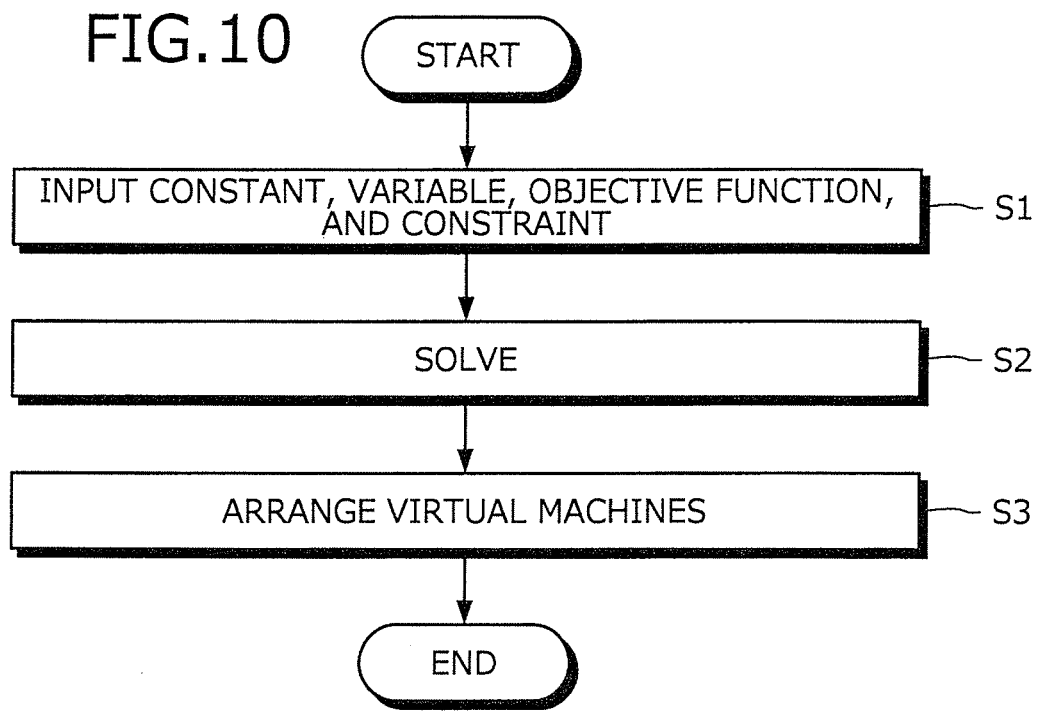
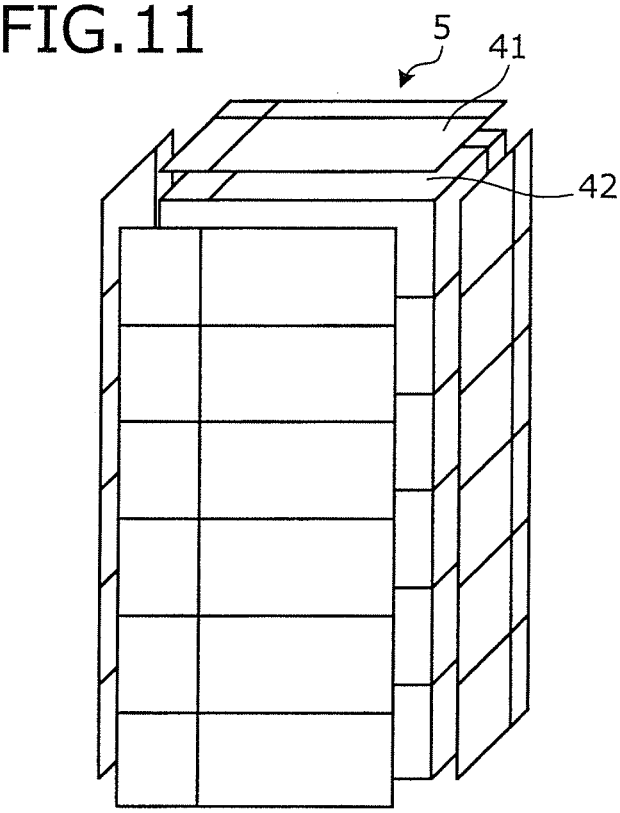

| RACK COUNT | SERVER COUNT/RACK |
|---|---|
| N | S |

| SCALING FACTOR |
|---|
| c |

FIG.17

| NUMBER | 1 | ... | S |
|---|---|---|---|
| 1 | $L_{11}$ | ... | $L_{1S}$ |
| ⋮ | ⋮ | ... | ⋮ |
| N | $L_{N1}$ | ... | $L_{NS}$ |

FIG.18

| NUMBER | 1 | ... | S |
|---|---|---|---|
| 1 | $a_{11}$ | ... | $a_{1S}$ |
| ⋮ | ⋮ | ... | ⋮ |
| N | $a_{N1}$ | ... | $a_{NS}$ |

FIG.19

| NUMBER | 1 | ... | S |
|---|---|---|---|
| 1 | $\beta_{11}$ | ... | $\beta_{1S}$ |
| ⋮ | ⋮ | ... | ⋮ |
| N | $\beta_{N1}$ | ... | $\beta_{NS}$ |

FIG.20

| NUMBER | 1 | ... | S |
|---|---|---|---|
| 1 | $Y^{-}_{11}$ | ... | $Y^{-}_{1S}$ |
| ⋮ | ⋮ | ... | ⋮ |
| N | $Y^{-}_{N1}$ | ... | $Y^{-}_{NS}$ |

FIG.21

| NUMBER | 1 | ... | S |
|---|---|---|---|
| 1 | $Y^+_{11}$ | ... | $Y^+_{1S}$ |
| ⋮ | ⋮ | ... | ⋮ |
| N | $Y^+_{N1}$ | ... | $Y^+_{NS}$ |

FIG.22

| NUMBER | 1 | ... | S |
|---|---|---|---|
| 1 | $w_{11}[0]$ | ... | $w_{1S}[0]$ |
| ⋮ | ⋮ | ... | ⋮ |
| N | $w_{N1}[0]$ | ... | $w_{NS}[0]$ |

FIG.23

| NUMBER | BASE POWER CONSUMPTION | PROPORTIONALITY FACTOR |
|---|---|---|
| 1 | $\eta_1$ | $\varepsilon_1$ |
| ⋮ | ⋮ | ⋮ |
| N | $\eta_N$ | $\varepsilon_N$ |

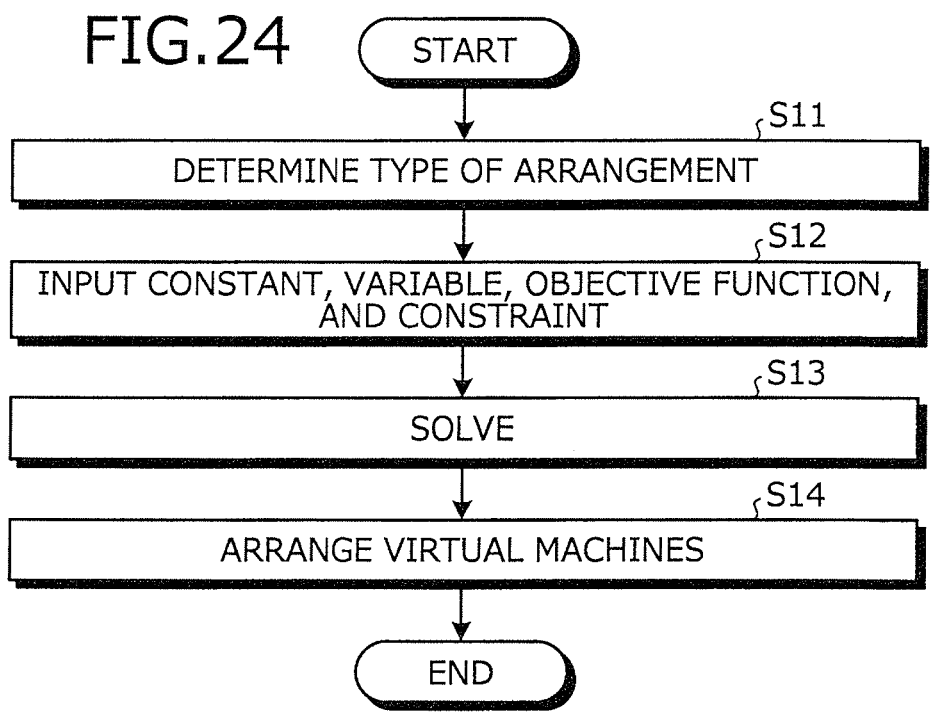

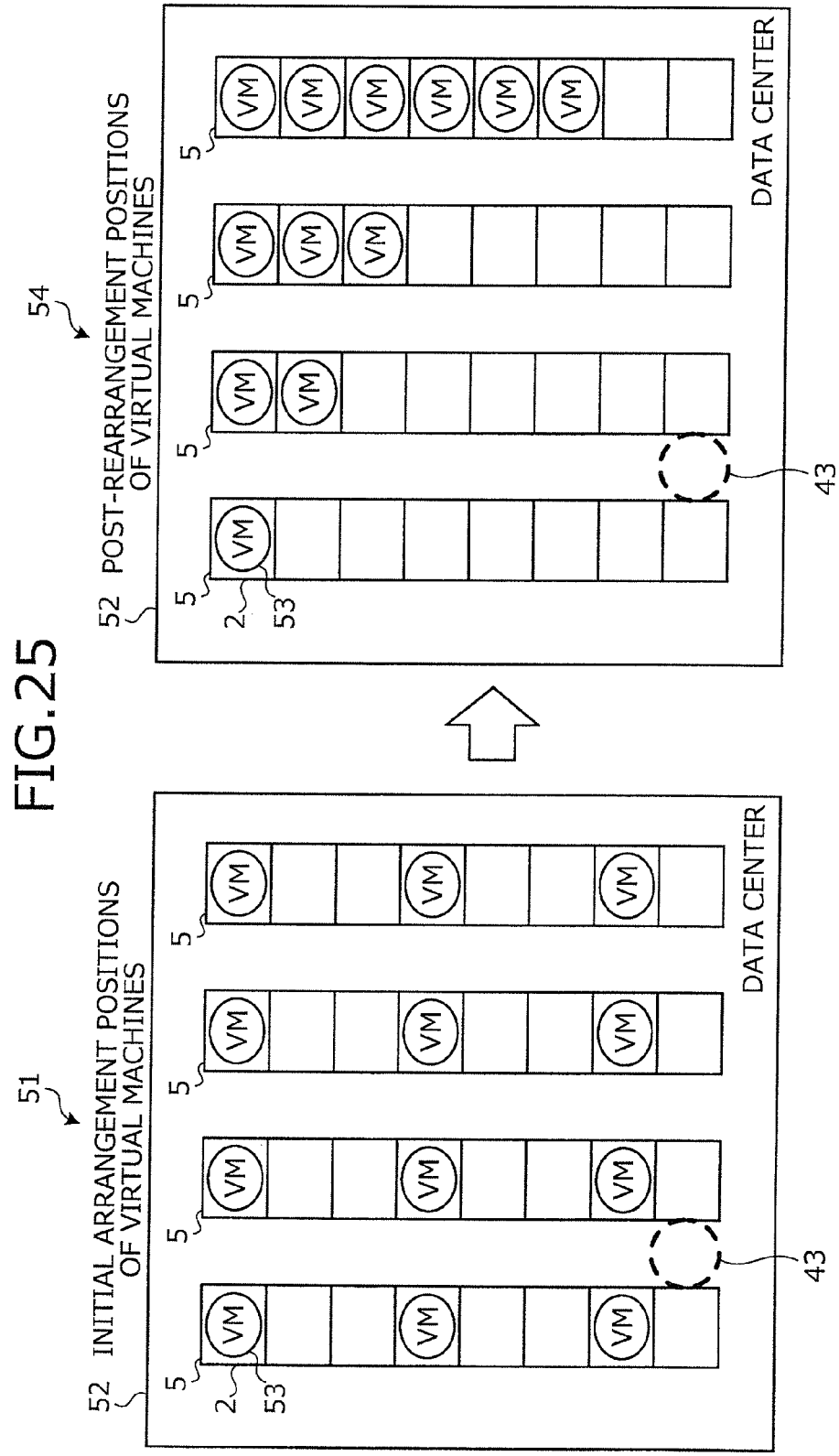

COMPUTER SYSTEM AND VIRTUAL MACHINE ARRANGING METHOD

CROSS REFERENCE TO RELATED APPLICATIONS

This application is a continuation application of International Application PCT/JP2012/054004, filed on Feb. 20, 2012 and designating the U.S., the entire contents of which are incorporated herein by reference.

FIELD

The embodiments discussed herein are related to a computer system and virtual machine arranging method.

BACKGROUND

Conventionally, among techniques of using a computer to perform optimum design analysis of a structure is a system that analyzes a structural shape that optimizes acoustic-structural coupled responses (sound pressure peak value, sound pressure level integration, exciting point deformation, resonance cancelling, etc.), which cause noise (see, e.g., Japanese Laid-Open Patent Publication No. 2007-188164). Another apparatus reduces the level of noise from a cooling device of a server to a proper noise level by determining the number of revolutions of a cooling fan according to the result of comparison between the air-intake temperature of cooling air and a temperature threshold, and increasing/decreasing the number of revolutions of the cooling fan according to the result of comparison between the temperatures of all electronic components and temperature thresholds for respective electronic components (see, e.g., Japanese Laid-Open Patent Publication No. 2011-151131).

The conventional techniques, however, pose a problem in that multiple virtual machines (VM) cannot be assigned to multiple servers such that the noise generated by the servers of a computer system is reduced at a specific location.

SUMMARY

According to an aspect of an embodiment, a computer system includes servers having virtual machines arranged therein; a noise source in each among the servers, the noise source emitting sound when the server is operated; and a controller that controls arrangement of the virtual machines in the servers. The controller solves an integer programming problem having an objective function representing a noise contribution described as any one among a function of virtual machine arrangement and a function of a job assignment count and indicating an extent of contribution of the sound emitted from the noise source to a noise volume at an evaluation point, by executing software for solving the integer programming problem on a processor, and based on a solution to the integer programming problem, causes the processor to arrange the virtual machines in the servers via an interface for the servers.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 3 is a block diagram of a functional configuration of the controller of the computer system of the second embodiment;

FIG. 4 depicts data that defines the number of servers in the computer system of the second embodiment;

FIG. 5 depicts data that defines the number of virtual machines in the computer system of the second embodiment;

FIG. 6 depicts data that defines the maximum number of virtual machines that can be executed in the computer system of the second embodiment;

FIG. 7 depicts data that defines a noise propagation attenuation constant in the computer system of the second embodiment;

FIG. 8 depicts data that defines noise source acoustic power in the computer system of the second embodiment;

FIG. 9 depicts data that defines base noise source acoustic power in the computer system of the second embodiment;

FIG. 10 is a flowchart of a virtual machine arranging method of the second embodiment;

FIG. 11 is a diagram for explaining a rack model by statistical energy analysis;

FIG. 17 depicts data that defines the maximum number of virtual machines that can be executed in the computer system of the third embodiment;

FIG. 18 depicts data that defines power consumption by virtual machines in the computer system of the third embodiment;

FIG. 19 depicts data that defines base power consumption in the computer system of the third embodiment;

FIG. 20 depicts data that defines power consumption by a transfer origin server from which a virtual machine is transferred in the computer system of the third embodiment;

FIG. 21 depicts data that defines power consumption by a transfer destination server to which a virtual machine is transferred in the computer system of the third embodiment;

FIG. 22 depicts initial arrangement data of virtual machines in the computer system of the third embodiment;

FIG. 23 depicts data that defines base power consumption by a power supply unit and a factor of proportionality in the computer system of the third embodiment;

FIG. 24 is a flowchart of the virtual machine arranging method of the third embodiment; and FIG. 25 is a diagram of an example of arrangement of virtual machines in the first to third embodiments.

DESCRIPTION OF EMBODIMENTS

An embodiment of a computer system and a virtual machine arranging method will be described in detail with reference to the drawings. An objective function for an integer programming problem may be described as a function of virtual machine arrangement or a function of a job assignment count. In the embodiments, a case of writing the objective function as the function of virtual machine arrangement will be described. The embodiments do not limit the present invention.

Figure 1:
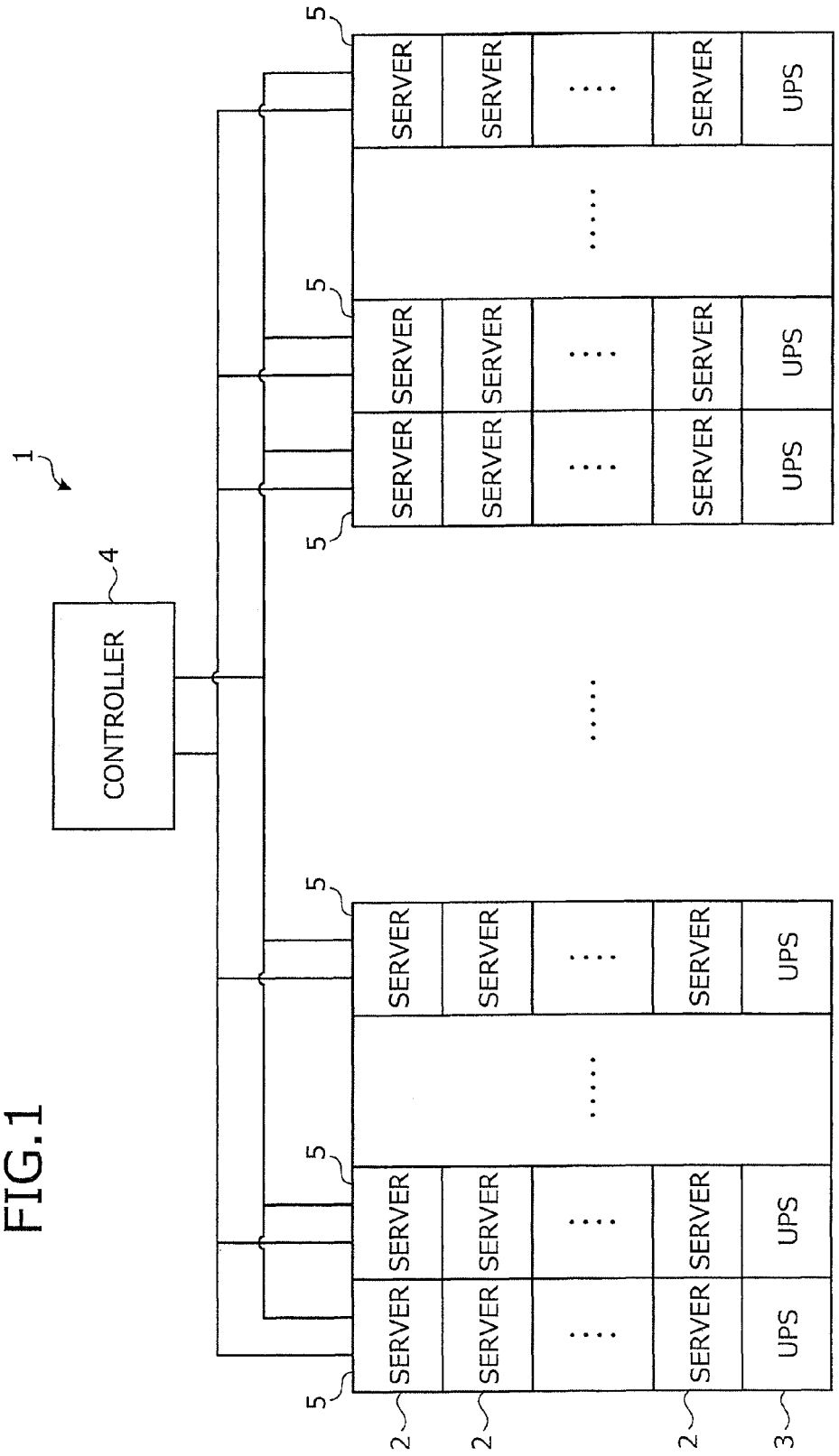
FIG. 1 is a block diagram of a computer system according to a first embodiment.

FIG. 1 is a block diagram of a computer system according to a first embodiment. As depicted in FIG. 1, a computer system 1 includes multiple servers 2 and a controller 4. Each server 2 has a noise source (not depicted) that emits sound when the server 2 is running. Virtual machines are arranged in the servers 2 by the controller 4 according to the state at the time of virtual machine arrangement. For example, virtual machines may be arranged uniformly in all servers 2 or in some servers 2. In another case, for example, virtual machines may be arranged so that power consumed by all servers 2 is reduced. In still another case, for example, virtual machines may be arranged so that noise at an evaluation point is reduced.

The controller 4 controls the arrangement of virtual machines with respect to the servers 2. The controller 4 solves an integer programming problem with an objective function representing a noise contribution described as a function of virtual machine arrangement, by causing a processor to execute software for solving the integer programming problem. The noise contribution represents the extent of contribution of sound emitted from the noise source to the volume of noise at the evaluation point. Based on a solution to the integer programming problem, the controller 4 causes the processor to arrange the virtual machines in the servers 2 through an interface for the servers 2 so that, for example, noise at the evaluation point is reduced.

According to the first embodiment, by solving the integer programming problem with the objective function representing the noise contribution at the evaluation point, virtual machine arrangement that reduces noise at the evaluation point can be determined. Thus, noise at the evaluation point by the computer system 1 can be reduced.

A second embodiment relates to an example of the computer system 1 of the first embodiment. For example, a data center is an example of the computer system 1. At the data center, many computers and data communication devices are operated.

In the computer system 1 depicted in FIG. 1, the data center includes multiple racks 5. Each rack 5 houses one or more servers 2 and one power supply unit 3, which is, for example, an uninterruptible power supply. In each rack 5, the power supply unit 3 supplies power to multiple servers 2 housed in the rack 5. Each rack 5 and the controller 4 are interconnected through, for example, a communication cable, such as local area network (LAN) cable, radio communication, etc.

Figure 2:
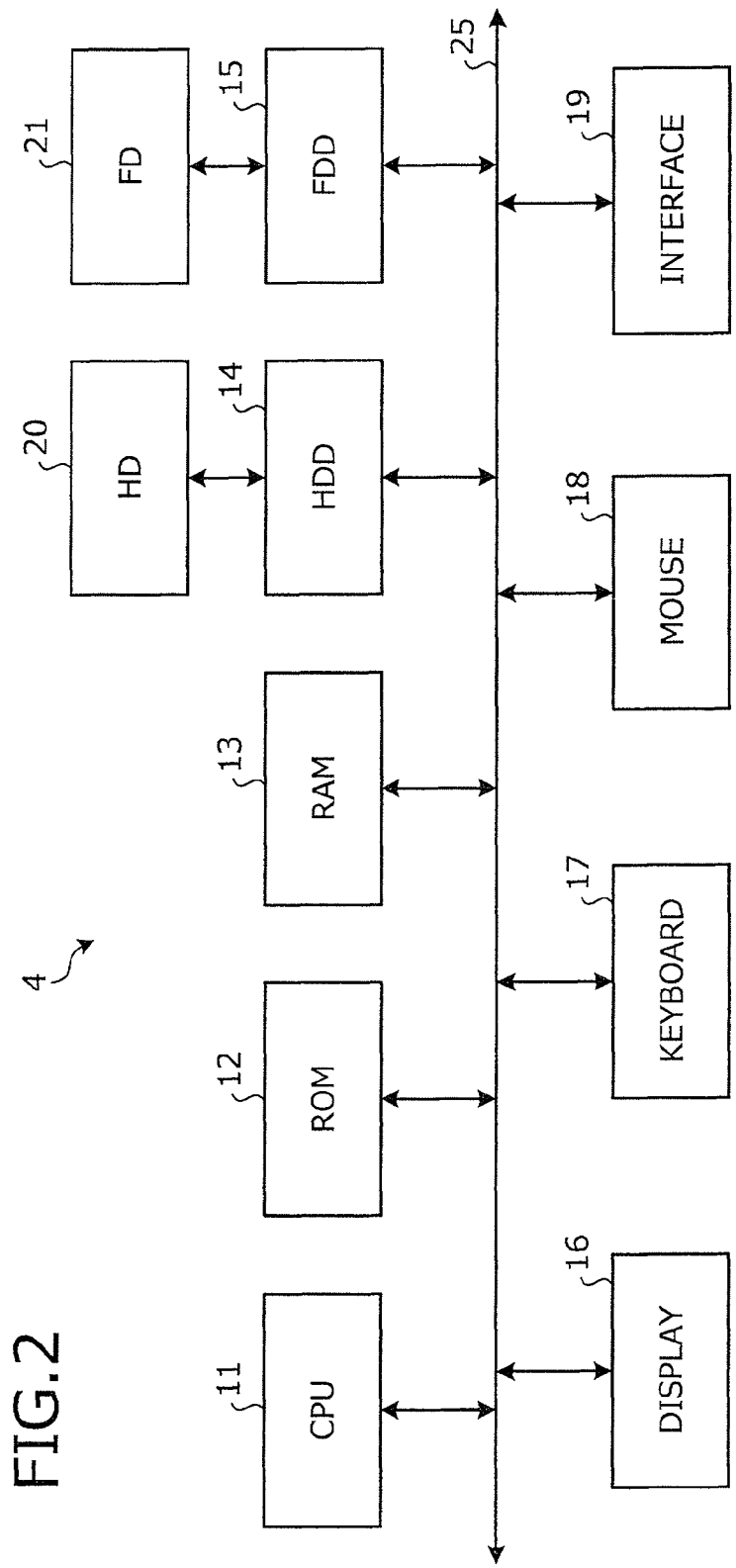
FIG. 2 is a block diagram of a hardware configuration of a controller of the computer system according to a second embodiment.

FIG. 2 is a block diagram of a hardware configuration of the controller of the computer system according to the second embodiment. As depicted in FIG. 2, the controller 4 includes a central processing unit (CPU) 11 serving as a processor, read-only memory (ROM) 12, random access memory (RAM) 13, a hard disk drive (HDD) 14, a hard disk (HD) 20, a flexible disk drive (FDD) 15, and a flexible disk (FD) 21, which is an example of a removable recording medium. The controller 4 also includes a display 16, a keyboard 17, a mouse 18, and an interface 19. These component units 11 to 19 are interconnected via a bus 25.

The CPU 11 supervises overall control of the controller 4. The CPU 11 executes a program that implements the virtual machine arranging method and thereby, solves an integer programming problem and arranges virtual machines. The virtual machine arranging method will be described later. The ROM 12 stores programs including a boot program and a program that implements the virtual machine arranging method. The RAM 13 is used as a work area for the CPU 11.

The hard disk drive 14 controls the reading and writing of data with respect to the hard disk 20. The hard disk 20 stores data written thereto under the control of the hard disk drive 14. The flexible disk drive 15 controls the reading and writing of data with respect to the flexible disk 21. The flexible disk 21 stores data written thereto under the control of the flexible disk drive 15.

The flexible disk 21 may be replaced with a removable recording medium other than the flexible disk 21, such as a CD-ROM (CD-R, CD-RW), MO, digital versatile disk (DVD), and a memory card. The display 16 displays a cursor, ions, tool boxes, and data including documents, images, functional information, etc. The display 16 may be provided as, for example, a CRT, a TFT liquid crystal display, and a plasma display.

The interface 19 is connected to each rack 5 of the data center via a network (not depicted). The interface 19 controls the input and output of data with respect to each rack 5. The interface 19 may be provided as, for example, a LAN adaptor, etc.

The keyboard 17 has keys for entering characters, numerals, or various instructions, and is used to input data. The keyboard 17 may be provided as a touch-panel type input pad, numeric keypad, etc. The mouse 18 is used to move the cursor or select a cursor range or to move a window or change the size thereof. The mouse 18 may be replaced with a track ball, joy stick, etc., provided that a function as pointing device is satisfied.

An image-scanning scanner may be connected to the controller 4. A printer, which is an example of an output device, may be connected to the controller 4. The controller 4 may be a computer, such as a personal computer and workstation, a cellular phone, or a portable information processing apparatus.

FIG. 3 is a block diagram of a functional configuration of the controller of the computer system of the second embodiment. As depicted in FIG. 3, the controller 4 includes a storing unit 32, a managing unit 33, a solution obtaining unit 34, and an arranging unit 35. These component units 32 to 35 may be implemented by executing on the CPU 11, a program that implements the virtual machine arranging method.

The managing unit 33 rewrites initial arrangement data of virtual machines, based on information of virtual machines arranged in the servers 2. The initial arrangement data includes the number of virtual machines arranged in each server 2. The initial arrangement data may be stored in, for example, in the storing unit 32.

The storing unit 32 stores therein data (constant), a variable, an objective function, and a constraint, and inputs the data (constant), variable, objective function, and constraint to the solution obtaining unit 34. The storing unit 32 may use memory such as the ROM 12 and RAM 13, as a storage medium. The data that does not change dynamically (constant), variable, object function, and constraint may be written in the program that implements the virtual machine arranging method.

The solution obtaining unit 34 solves an integer programming problem, based on data (constant), a variable, an objective function, and a constraint received from the storing unit 32. When virtual machine arrangement is performed, the solution obtaining unit 34 may solve an integer programming problem formulated by, for example, equations (12) to (16) described later.

An example of the solution obtaining unit 34 is software (solver) for solving an integer programming problem. An example of the solver is GLPK, SYMPHONY, Gurobi, etc. Based on a solution to an integer programming problem obtained by the solution obtaining unit 34, the arranging unit 35 arranges virtual machines in the server 2.

FIG. 4 depicts data that defines the number of servers in the computer system of the second embodiment. As depicted in FIG. 4, the number of servers installed in the data center is N, which denotes a positive integer.

FIG. 5 depicts data that defines the number of virtual machines in the computer system of the second embodiment. As depicted in FIG. 5, the number of virtual machines to be arranged is M, which denotes a positive integer.

FIG. 6 depicts data that defines the maximum number of virtual machines that can be executed in the computer system of the second embodiment. As depicted in FIG. 6, the maximum number of virtual machines that can be executed at the i-th server is $L_i$. $L_i$ denotes a positive integer and i denotes an integer of 1 to N.

FIG. 7 depicts data that defines a noise propagation attenuation constant in the computer system of the second embodiment. The extent of attenuation of sound during the course of propagation of the sound from its origin, i.e., noise source, to an evaluation point is determined by the noise propagation attenuation constant. The noise propagation attenuation constant is a constant coefficient of acoustic power attenuation during propagation from the noise source to the evaluation point. As depicted in FIG. 7, the noise propagation attenuation constant for sound propagation from the i-th server to the evaluation point is $C_i$, which denotes a positive integer.

FIG. 8 depicts data that defines noise source acoustic power in the computer system of the second embodiment. The noise source acoustic power is the total amount of energy of sound emitted from a noise source and passing through a specific plane in one second. As depicted in FIG. 8, the noise source acoustic power of each virtual machine operating in the i-th server is $\lambda_i$, which denotes a positive real number.

FIG. 9 depicts data that defines base noise source acoustic power in the computer system of the second embodiment. A base noise source emits a noise when the power supply to the server is turned on. An example of the base noise source is a cooling fan disposed in the server. As depicted in FIG. 9, base noise source acoustic power generated from the i-th server as a result of turning on of the power supply for the i-th server is $k_i$, which denotes a positive real number.

The value of N is determined in advance according to the configuration of the data center. Respective values of $L_i$, $C_i$, $\lambda_i$, and $k_i$ are determined in advance according to the server. The value of M is determined according to the number of applications to be started.

FIG. 10 is a flowchart of the virtual machine arranging method of the second embodiment. As depicted in FIG. 10, when arrangement of virtual machines is started, the storing unit 32 inputs data (constant), a variable, an objective function, and a constraint, to the solution obtaining unit 34 (step S1). Based on the input data (constant), variable, objective function, and constraint, the solution obtaining unit 34 solves an integer programming problem using, for example, a solver, to finds a solution (step S2). Formulation into an integer programming problem will be described later. The arranging unit 35 arranges virtual machines, based on the solution obtained by the solution obtaining unit 34 (step S3). Thus, a series of steps of virtual machine arrangement comes to an end.

Formulation as Integer Programming Problem (1) Modeling of Server Noise Contribution Although no specific modeling method is specified, for example, a noise contribution by the server is modeled using the product of a noise propagation attenuation constant and noise source acoustic power. Noise source acoustic power is modeled as a variable dependent on the number of virtual machines arranged in the server.

A noise contribution at the evaluation point by the i-th server is expressed by equation (1), where $C_i$ denotes a noise propagation attenuation constant and $[k_i v_i + \lambda_i w_i]$ denotes noise source acoustic power.

In equation (1), $w_i$ denotes the number of virtual machines executed at the i-th server, and is an integer variable of 0 or more to $L_i$ or less. $v_i$ is a variable representing a state of operation or suspension of the server. When the value of $v_i$ is 0, the server is stopped, that is, the power source is off. If the value of $v_i$ is 1, the server is running, that is, the power supply is on.

Server Noise Contribution at Evaluation $$\text{Point} = C_i(k_i v_i + \lambda_i w_i) \tag{1}$$

(2) Calculation of Noise Propagation Attenuation Constant

When the position of the noise source of the server and the position of an evaluation point are determined, a noise propagation attenuation constant of noise attenuation during propagation from the position of the noise source to the position of the evaluation point can be calculated by acoustic analysis. Although no specific method is specified, for example, a statistical energy analysis (SEA) can be used for acoustic analysis of the server interior, and a sound-ray tracing technique (geometric acoustics theory) can be used for acoustic analysis of the server exterior.

1) Statistical Energy Analysis

The cooling fan is considered to be a major noise source of the server and propagation of the fan acoustic power to the server surface is determined. According to the statistical energy analysis (SEA), an analysis subject is divided into analysis elements, which are composed of plate-like plate elements and acoustic elements representing special acoustics that are combined to create a model.

Figure 12:
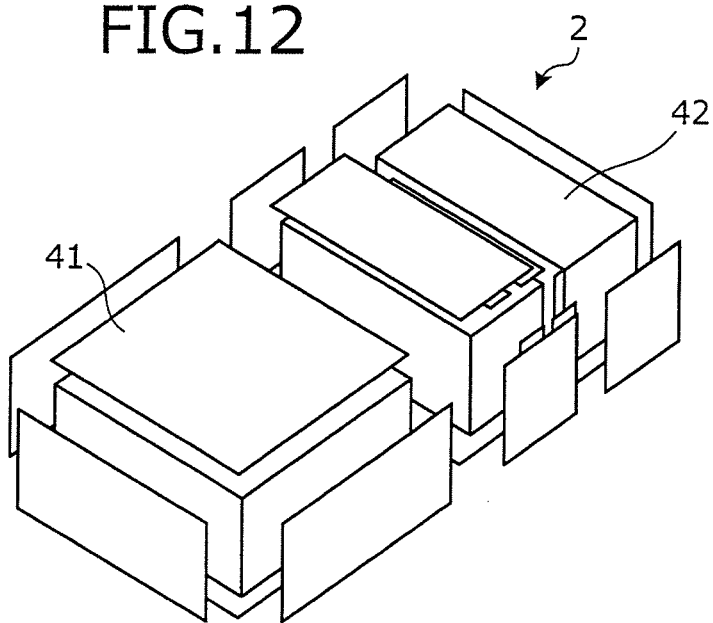
FIG. 12 is a diagram for explaining a server model by the statistical energy analysis.

FIG. 11 is a diagram for explaining a rack model by the statistical energy analysis. FIG. 12 is a diagram for explaining a server model by the statistical energy analysis. As depicted in FIGS. 11 and 12, each of the racks 5 and servers 2 in the data center is converted into a SEA model composed of plate elements 41 and acoustic elements 42.

A basic equation of the statistical energy analysis is equation (2), where P denotes a noise source acoustic power vector, L denotes a coefficient matrix composed of a coupling loss rate, an internal loss rate, and a central frequency, and E denotes the energy vector of each element. Based on equation (2), the energy of the plate element 41 and of the acoustic element 42 is expressed by equation (3).

$$P = LE \tag{2}$$

$$E = L^{-1} P \tag{3}$$

Based on equation (3), the energy $E_s$ of each element on the surface of the rack 5 and the surface of the server 2 is expressed by equation (4), where B denotes a surface element selection matrix. In the surface element selection matrix B, matrix elements corresponding to surface elements are each defined as 1 while the other matrix elements are each defined as 0. An example of the surface element selection matrix B is indicated as equation (5).

$$E_s = BE = BL^{-1}P \tag{4}$$

$$B = \begin{bmatrix} 0 & 1 & \cdots & 0 \\ 1 & 0 & \ddots & \vdots \\ \vdots & \ddots & \ddots & 1 \\ 0 & \cdots & 1 & 0 \end{bmatrix} \tag{5}$$

Based on equation (4), radiating acoustic power from each element on the surface of the rack 5 and the surface of the server 2 is expressed by equation (6), where H denotes a coefficient matrix of a coupling loss rate between a semi-infinite fluid (SIF) and a surface element and a central frequency. By performing acoustic analysis of the interior of each server 2 using the statistical energy analysis, acoustic power radiating from the surface of the rack 5 and the surface of the server 2 can be determined.

$$P_s = HE_s = HBL^{-1}P \quad (6)$$

2) Sound-Ray Tracing Technique (Geometric Acoustic Theory)

Figure 13:
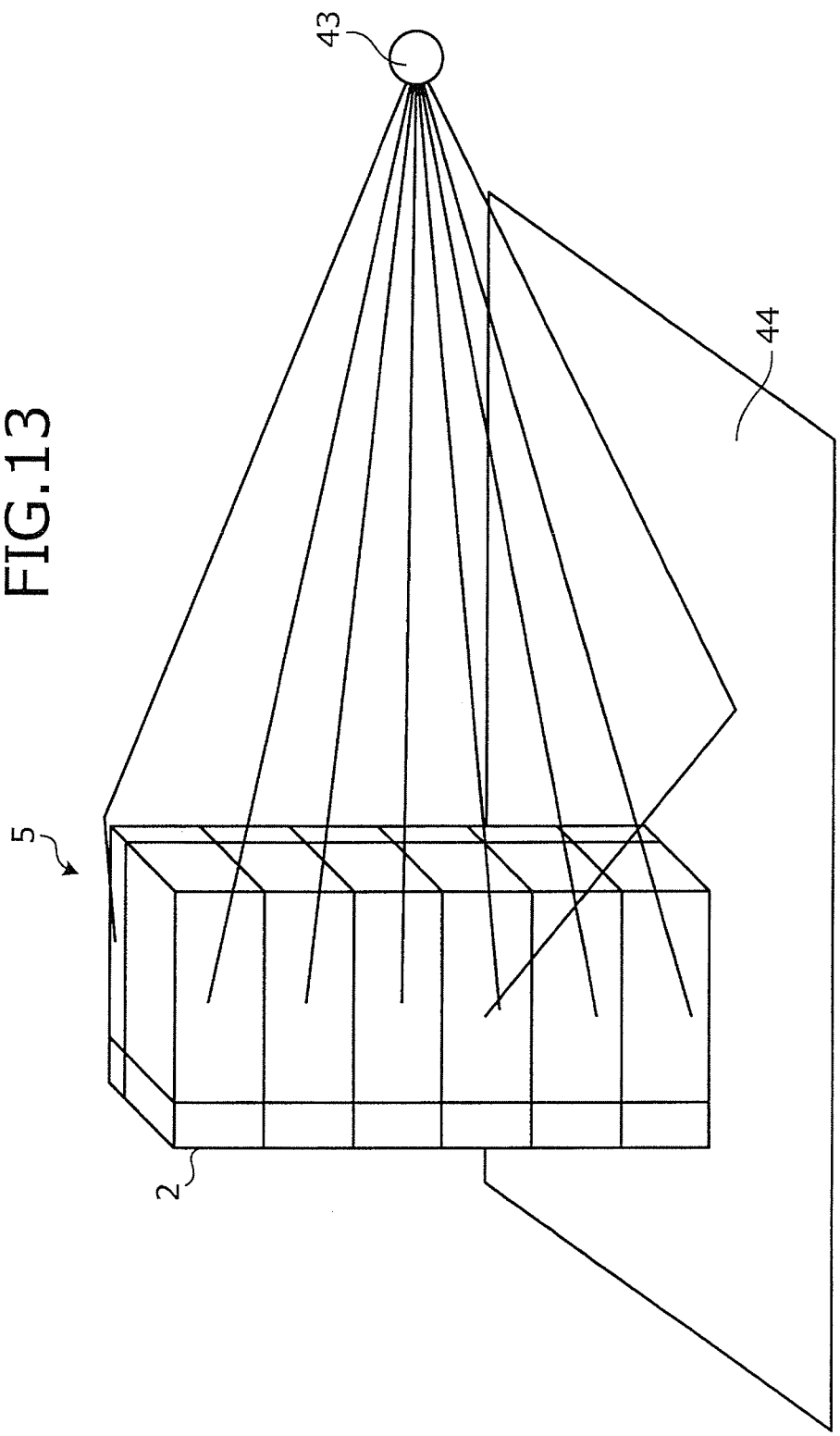
FIG. 13 is a diagram for explaining analysis of diffusion attenuation of radiating acoustic power by a sound-ray tracing technique.

FIG. 13 is a diagram for explaining analysis of the diffusion attenuation of radiating acoustic power by a sound-ray tracing technique. As depicted in FIG. 13, when radiating acoustic power propagates, the acoustic power attenuates consequent to traveling the distance between the surface of each server 2 and an evaluation point 43, diffraction, and reflection on a floor 44, etc. As these factors of attenuation are taken into consideration, the diffusion attenuation of the radiating acoustic power is determined by the sound-ray tracing technique.

Acoustic power at the evaluation point 43 is expressed by equation (7), where D denotes a diagonal matrix, which is an attenuation matrix defined by the sound-ray tracing technique. By performing acoustic analysis of the exterior of each server 2 using the sound-ray tracing technique, the attenuation rate of acoustic power radiating from the surface of each server 2 can be determined.

$$P_e = DP_s = DHBL^{-1}P \quad (7)$$

3) Calculation of Noise Propagation Attenuation Constant

An acoustic power vector at the evaluation point 43 is calculated for a case where only the analysis element n has a noise source. A noise source acoustic power vector P is expressed by equation (8), where $I_n$ denotes an element having the cooling fan serving as a major noise source in the model of FIG. 12. $I_n$ represents a matrix in which an element having the cooling fan is defined as 1 and the other elements are each defined as 0.

$$P = I_n P_i = \begin{bmatrix} 0 \\ 1 \\ \vdots \\ 0 \end{bmatrix} P_i \quad (8)$$

Based on equations (7) and (8), an acoustic power vector at the evaluation point 43 is expressed by equation (9). $P_e^i$ and $Q_e^i$ of equation (9) are given by equation (10).

$$P_e^i = DHBL^{-1}(I_n P_i) = (DHBL^{-1} I_n)P_i = Q_e^i P_i \quad (9)$$

$$P_e^i = \begin{bmatrix} p_{e0} \\ p_{e1} \\ \vdots \\ p_{en} \end{bmatrix}, Q_e^i = \begin{bmatrix} q_{e0} \\ q_{e1} \\ \vdots \\ q_{en} \end{bmatrix} \quad (10)$$

The sum of matrix elements of $P_e^i$ represents the noise contribution of the servers 2. Thus, the noise contribution of the server 2 is expressed by equation (11).

$$\text{Server Noise Contribution} = \sum_i^n p_{ei} = \left(\sum_i^n q_{ei}\right) p_i \quad (11)$$

(3) Formulation into Integer Programming Problem

A noise suppression problem at execution of virtual machine arrangement can be formulated into an integer programming problem expressed by equations (12) to (16). Equation (12) represents an objective function and equations (13) to (16) represent constraints. Equation (15) is a constraint that should be met to match the total number of actually arranged virtual machines to the number of virtual machines to be arranged. In these equations, $w_i$, $v_i$, i=1, ..., and N denote coefficients of determination.

$$\underset{i}{\text{Minimize}} \sum C_i(\kappa_i v_i + \lambda_i w_i) \quad (12)$$

$$w_i \in \{0,1, \ldots, L_i\}, i = 1, \ldots, N \quad (13)$$

$$v_i \in \{0,1\}, i = 1, \ldots, N \quad (14)$$

$$\sum_i^N w_i = M \quad (15)$$

$$v_i \le w_i \le L_i v_i \ i = 1, \ldots, N \quad (16)$$

According to the second embodiment, arrangement of virtual machines that reduces noise at the evaluation point 43 can be determined by solving an integer programming problem with an objective function representing noise contribution at the evaluation point 43. Noise at the evaluation point 43 in the data center, therefore, can be reduced. By determining the evaluation point 43 to be a place where system engineers or customer engineers work at the data center, adverse effects of noise on the engineers' bodies is prevented and noise disturbance of communication between engineers is also prevented.

A third embodiment relates to a case where virtual machine arrangement that simultaneously achieves noise suppression and power-saving at the data center is determined by solving an integer programming problem formulated by combining together a noise suppression problem at the evaluation point and power-saving problem at the data center. The hardware configurations of the data center and controller in this embodiment are the hardware configurations described in the second embodiment.

Figures 14, 15, 16:
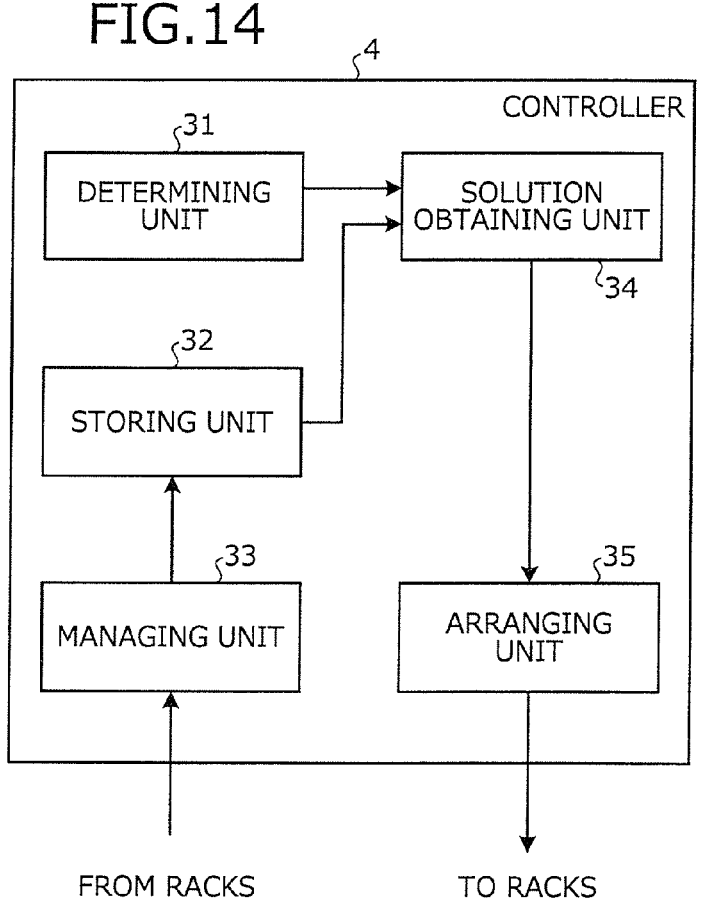
FIG. 14 is a block diagram of a functional configuration of the controller of the computer system according to a third embodiment.
FIG. 15 depicts data that defines a configuration of a data center of the computer system of the third embodiment.
FIG. 16 depicts data that defines a scaling factor in the computer system of the third embodiment.

FIG. 14 is a block diagram of a functional configuration of the controller of the computer system according to the third embodiment. As depicted in FIG. 14, the controller 4 includes a determining unit 31, in addition to the functional component units of the controller 4 of the second embodiment. The determining unit 31 may be implemented by executing on the CPU 11, a program that implements the virtual machine arranging method.

The determining unit 31 determines the integer programming problem to be solved among a problem corresponding to initial arrangement of virtual machines, a problem corresponding to additional arrangement of virtual machines, or a problem corresponding to rearrangement of virtual machines. Based on the result of the determination, the determining unit 31 issues an instruction to the solution obtaining unit 34.

By solving the integer programming problem corresponding to the initial arrangement of virtual machines, one or more virtual machines can be arranged in one or more servers 2 when all servers 2 are suspended. The state of initial arrangement of virtual machines in this case is the state where no virtual machine is arranged in any server 2.

By solving the integer programming problem corresponding to an additional arrangement of virtual machines, in the state of initial arrangement where one or more virtual machines are already arranged in one or more servers 2, one or more virtual machines can be additionally arranged in one or more servers 2. Virtual machines already arranged in the state of initial arrangement are not transferred to a different server 2.

By solving the integer programming problem corresponding to the rearrangement of virtual machines, in the state of initial arrangement where one or more virtual machines are already arranged in one or more servers 2, virtual machines can be rearranged through live migration. Through live migration, a virtual machine arranged in a certain server 2 can be transferred to a different server 2 without suspending operation of the virtual machine. The controller 4 monitors the operating time of the data center with a built-in timer, etc., and may rearrange virtual machines at given periods.

The solution obtaining unit 34 solves an integer programming problem, based on data (constant), a variable, an objective function, and a constraint received from the storing unit 32 and an instruction from the determining unit 31.

A noise suppression problem and a power-saving problem at execution of virtual machine arrangement can be formulated into an integer programming problem expressed by equation (17), where $\rho$ denotes a weight that a user sets based on a policy when executing virtual machine arrangement. $\rho$ is a positive real number.

$$\underset{\text{Minimize}}{\sum} (\text{power consumption by each server} + \rho \times \text{noise contribution of each server}) \quad (17)$$

Constraints:
Number of virtual machines to be executed, fixed number of jobs
Maximum number of virtual machines that can be executed by one server
Number of virtual machines to be executed that is equal to or smaller than maximum number of jobs In equation (17), the noise contribution of each server is the noise contribution of each server described in the second embodiment. A case of determining power consumption by each server and formulating a power-saving problem into an integer programming problem will hereinafter be described.

(1) Description of Data Structure

FIG. 15 depicts data that defines the configuration of the data center of the computer system of the third embodiment. As depicted in FIG. 15, the number of racks installed in the data center is N, and the number of servers in one rack is S. Each of N and S denotes a positive integer.

Data that defines the number of virtual machines in the computer system of the third embodiment is the data of FIG. 5, which means that the number of virtual machines to be arranged is M.

FIG. 16 depicts data that defines a scaling factor in the computer system of the third embodiment. The scaling factor is a constant that determines which power consumption reduction should be emphasized at execution of virtual machine rearrangement among a reduction in power consumption after the rearrangement or a reduction in power consumption by live migration. As depicted in FIG. 16, the scaling factor is denoted as c, which is a positive real number.

For example, c may denote a value given by dividing the average operation time of virtual machines during live migration by the average operation time of virtual machines after the rearrangement. In this case, c takes a value smaller than 1. By selecting the scaling factor c in this manner, the total power consumption representing the sum of power consumption by the server 2 and power consumption by the power supply unit 3 can be minimized.

FIG. 17 depicts data that defines the maximum number of virtual machines that can be executed in the computer system of the third embodiment. As depicted in FIG. 17, the maximum number of virtual machines that can be executed at the j-th server in the i-th rack is $L_{ij}$, which is a positive integer. i denotes an integer of 1 to N and j denotes an integer of 1 to S.

FIG. 18 depicts data that defines power consumption by virtual machines in the computer system of the third embodiment. As depicted in FIG. 18, power consumed by each virtual machine operating at the j-th server in the i-th rack is $\alpha_{ij}$ watts. $\alpha_{ij}$ is a positive real number.

FIG. 19 depicts data that defines base power consumption in the computer system of the third embodiment. As depicted in FIG. 19, power that is consumed as a result of turning on of the power supply to the j-th server in the i-th rack is $\beta_{ij}$ watts. $\beta_{ij}$ is a positive real number.

FIG. 20 depicts data that defines power consumption by a transfer origin server from which a virtual machine is transferred in the computer system of the third embodiment. When the virtual machine is transferred through live migration, the transfer origin server consumes power. As depicted in FIG. 20, power that is consumed when one virtual machine is transferred from the j-th server in the i-th rack to a different server is $\gamma-_{ij}$ watts. $\gamma-_{ij}$ is a positive real number.

FIG. 21 depicts data that defines power consumption by a transfer destination server to which a virtual machine is transferred in the computer system of the third embodiment. When the virtual machine is transferred through live migration, the transfer destination server consumes power. As depicted in FIG. 21, power that is consumed when one virtual machine is transferred from a certain server to the j-th server in the i-th rack is $\gamma+_{ij}$ watts. $\gamma+_{ij}$ is a positive real number.

FIG. 22 depicts initial arrangement data of virtual machines in the computer system of the third embodiment. As depicted in FIG. 22, the number of virtual machines already arranged in the j-th server in the i-th rack is $w_{ij}[0]$, which is an integer of 0 or more to $L_{ij}$ or less.

FIG. 23 depicts data that defines base power consumption by the power supply unit and a factor of proportionality in the computer system of the third embodiment. As depicted in FIG. 23, base power consumption by the power supply unit of the i-th rack, the base power consumption representing constant power consumption by the power supply unit, is $\eta_i$ watts. $\eta_i$ is a positive real number. A factor of proportionality indicates how many times the power consumed by the power supply unit 3 is as large as the total power consumption by servers in the i-th rack is, and is denoted as $\epsilon_i$, which is a positive real number. For example, a catalog of an ordinary power supply unit indicates $\epsilon_i$ of 0.01 to 0.04.

The values of N and S are determined in advance according to the configuration of the data center. The values of c, $L_{ij}$, $\alpha_{ij}$, $\beta_{ij}$, $\gamma-_{ij}$, and $\gamma+_{ij}$ are determined in advance according to the server. The values of $\eta_i$ and $\epsilon_i$ are determined in advance according to the power supply unit. The value of $w_{ij}[0]$ is rewritten dynamically by the managing unit 33 during operation of the data center. The value of M is determined according to the number of applications to be started.

(2) Formulation into Integer Programming Program 1) Modeling of Power Consumption Modeling of power consumption by the server, of power consumption by the power supply unit, of total power consumption by the servers and power supply unit in the rack, and of total power consumption by the servers and power supply units in the data center will be described.

2) Modeling of Power Consumption by Server

The server has the following properties (S-1) to (S-3) related to power consumption.

(S-1) When any one of virtual machines is executed, the power supply to the server is turned on. When the number of virtual machines under execution is zero, the power supply to the server is turned off.

(S-2) When the power supply is turned on, a given amount of power is consumed.

(S-3) As the number of virtual machines under execution increases, power consumption increases.

A variable representing the number of virtual machines executed at the j-th server in the i-th rack is denoted as $w_{ij}$, which is an integer variable of 0 or more to $L_{ij}$ or less. For the jδ-th server in the i-th rack, $v_{ij}$ is defined as a variable taking a value of 0 or 1. The following constraint is imposed on this variable $v_{ij}$.

$$v_{ij} \leq w_{ij} \leq L_{ij} v_{ij} \tag{18}$$

In the above inequality (18), when $w_{ij}$ is 1 or more, if $v_{ij}$ is 0, the right side of the inequality (18) does not hold true. $v_{ij}$, therefore, must be 1 in this case. When $w_{ij}$ is 0, on the other hand, if $v_{ij}$ is 1, the left side of the inequality (18) does not hold true. $v_{ij}$, therefore, must be 0 in this case.

The value of $v_{ij}$ thus represents on/off of the power supply to the server. The value of $v_{ij}$ being 0 indicates that the power supply to the server is off, while the value of $v_{ij}$ being 1 indicates that the power supply to the server is on. This is expressed by the following equations (19) and (20).

$$w_{ij} \geq 1 \Leftrightarrow \text{server power on} \Leftrightarrow v_{ij} = 1 \tag{19}$$

$$w_{ij} = 0 \Leftrightarrow \text{server power off} \Leftrightarrow v_{ij} = 0 \tag{20}$$

Using the above constants and variables, power consumption by the i-th server in the i-th rack is given by equation (21), which expresses the above properties (S-1) to (S-3) in the form of a linear equation of $w_{ij}$ and $v_{ij}$.

$$\beta_{ij} v_{ij} + \alpha_{ij} w_{ij} \tag{21}$$

In equation (21), $\alpha_{ij} w_{ij}$ represents [power consumed by each virtual machine×number of virtual machines], thus representing power consumption proportional to the number of virtual machines. Since $\beta_{ij} v_{ij} = \beta_{ij}$ results when the power supply to the server is on and $\beta_{ij} v_{ij} = 0$ results when the power supply to the server is off, $\beta_{ij} v_{ij}$ represents power that is consumed as a result of turning on of the power supply to the server.

3) Modeling of Power Consumption by Power Supply Unit

The power supply unit has the following properties (U-1) and (U-2) related to power consumption.

(U-1) A fixed amount of power is consumed constantly regardless of the operation condition of servers in the rack.

(U-2) As the total power consumption by servers in the rack increases, power consumption by the power supply unit increases.

Based on the properties (U-1) and (U-2), power consumption by the power supply unit installed in the i-th rack is given by equation (22), which expresses the properties (U-1) and (U-2) in the form of a linear equation of $w_{ij}$ and $v_{ij}$.

$$\eta_i + \varepsilon_i \sum_{j=1}^{S} (\beta_{ij} v_{ij} + \alpha_{ij} w_{ij}) \tag{22}$$

In equation (22), $[\Sigma(\beta_{ij}v_{ij}+\alpha_{ij}w_{ij})]$ (index j is omitted from Σ) represents total power consumption by the servers in the i-th rack. The second term of equation (22), which is the product of the total power consumption by the servers in the i-th rack and $\varepsilon_i$, represents power consumption by the power supply unit proportional to the total power consumption by the servers in the i-th rack. $\eta_i$ represents constant power consumption by the power supply in the i-th rack.

4) Modeling of Total Power Consumption by Servers and Power Supply Unit in Rack

As described in 3) Modeling of Power Consumption by Power Supply Unit, the total power consumption by the servers in the i-th rack is $[\Sigma(\beta_{ij}v_{ij}+\alpha_{ij}w_{ij})]$ (index j is omitted from Σ), and the power consumption by the power supply unit installed in the i-th rack is expressed by equation (22). Adding up the total power consumption by the servers in the i-th rack and the power consumption by the power supply unit installed in the i-th rack yields total power consumption by the i-th rack. Thus, the total power consumption by the i-th rack is expressed by equation (23).

$$\eta_i + (1+\varepsilon_i) \sum_{j=1}^{S} (\beta_{ij} v_{ij} + \alpha_{ij} w_{ij}) \tag{23}$$

The number of the servers in the rack may be variable. If the number of the servers in the rack is variable and the number of the servers in the i-th rack is s denoting an integer smaller than the integer denoted by S, the above equation is given under a constraint of $[w_{ij}=0, j \geq s]$ in solving an integer programming problem.

5) Modeling of Total Power Consumption by Servers and Power Supply Units in Data Center Adding up the above equations (23) for all the first to N-th racks yields total power consumption by the data center. Thus, the total power consumption by the data center is expressed by equation (24).

$$\sum_{i=1}^{N} \left( \eta_i + (1+\varepsilon_i) \sum_{j=1}^{S} (\beta_{ij} v_{ij} + \alpha_{ij} w_{ij}) \right) \tag{24}$$

Formulation into an integer programming problem will be described for each of the cases of initial arrangement of virtual machines, additional arrangement of virtual machines, and rearrangement of virtual machines.

6) Initial Arrangement of Virtual Machines

When initial arrangement of virtual machines is performed, no virtual machine is arranged in any server. Therefore, the power supplies to all servers are off.

A power-saving problem of saving power consumption by the servers and power supply units at execution of initial arrangement of virtual machines can be formulated into an integer programming problem expressed by the following equations (25) to (29). Equation (25) represents an objective function and the equations (26) to (29) represent constraints. Equation (28) is a constraint that should be met to match the total number of actually arranged virtual machines to the number of virtual machines to be arranged. In these equations, $w_{ij}$, $v_{ij}$, $i=1, \ldots, N$, $j=1, \ldots$, and S denote coefficients of determination.

Minimize (25)

$$\sum_{i=1}^{N}\left(\eta_i + (1+\varepsilon_i)\sum_{j=1}^{S}(\beta_{ij}v_{ij} + \alpha_{ij}w_{ij})\right)$$

$$w_{ij} \in \{0,1,\ldots,L_{ij}\}, i=1,\ldots,N, j=1,\ldots,S \quad (26)$$

$$v_{ij} \in \{0,1\}, i=1,\ldots,N, j=1,\ldots,S \quad (27)$$

$$\sum_{i=1}^{N}\sum_{j=1}^{S} w_{ij} = M \quad (28)$$

$$v_{ij} \le w_{ij} \le L_{ij}v_{ij}, i=1,\ldots,N, j=1,\ldots,S \quad (29)$$

7) Additional Arrangement of Virtual Machines

It is assumed that when additional arrangement of virtual machines is performed, $w_{ij}[0]$ virtual machines are already arranged in the j-th server in the i-th rack and that the currently arranged virtual machines are not transferred. Because an additional virtual machine is arranged in the server already equipped with $w_{ij}[0]$ virtual machines in a state of initial arrangement, $w_{ij}$ is $w_{ij}[0]$ or greater. This is expressed as a constraint given by equation (30).

$$w_{ij} \in \{w_{ij}[0], \ldots, L_{ij}\}, i=1,\ldots,N, j=1,\ldots S \quad (30)$$

The number of additionally arranged virtual machines is denoted as $\Delta M$. Since the number of virtual machines arranged in the state of initial arrangement is $[\Sigma\Sigma w_{ij}[0]]$ (index i is omitted from the former $\Sigma$ and index j is omitted from the latter $\Sigma$), the number of virtual machines after the additional arrangement is $[\Sigma\Sigma w_{ij}[0]+\Delta M]$ (index i is omitted from the former $\Sigma$ and index j is omitted from the latter $\Sigma$).

A power-saving problem of saving power consumption by the servers and power supply units at execution of additional arrangement of virtual machines can be formulated into an integer programming problem expressed by the following equations (31) to (35). Equation (31) represents an objective function and the equations (32) to (35) represent constraints. Equation (34) is the constraint that should be met to match the total number of virtual machines after the additional arrangement to the sum of the number of virtual machines in the state of initial arrangement and the number of additionally arranged virtual machines. In these equations, $w_{ij}$, $v_{ij}$, $i=1,\ldots,N$, $j=1,\ldots$, and S denote coefficients of determination.

Minimize (31)

$$\sum_{i=1}^{N}\left(\eta_i + (1+\varepsilon_i)\sum_{j=1}^{S}(\beta_{ij}v_{ij} + \alpha_{ij}w_{ij})\right)$$

$$w_{ij} \in \{w_{ij}[0],\ldots,L_{ij}\}, i=1,\ldots,N, j=1,\ldots,S \quad (32)$$

$$v_{ij} \in \{0,1\}, i=1,\ldots,N, j=1,\ldots,S \quad (33)$$

$$\sum_{i=1}^{N}\sum_{j=1}^{S} w_{ij} = M := \sum_{i=1}^{N}\sum_{j=1}^{S} w_{ij}[0] + \Delta M \quad (34)$$

$$v_{ij} \le w_{ij} \le L_{ij}v_{ij}, i=1,\ldots,N, j=1,\ldots,S \quad (35)$$

8) Rearrangement of Virtual Machines

It is assumed that when rearrangement of virtual machine is performed, $w_{ij}[0]$ virtual machines are already arranged in the j-th server in the i-th rack. In the process of rearrangement of virtual machines, a virtual machine is transferred through live migration. When the virtual machine is transferred through live migration, power is consumed by a transfer origin server from which the virtual machine is transferred as well as by a transfer destination server to which the virtual machine transferred.

For the j-th server in the i-th rack, is defined as a variable taking a value of 0 or 1. The following constraint is imposed on this variable $\delta^-_{ij}$, in which constraint d is a positive real number smaller than 1.

$$d+(-L_{ij}-d)\delta_{ij}^- \le w_{ij}-w_{ij}[0] \le L_{ij}(1-\delta_{ij}^-) \quad (36)$$

In the above inequality (36), when $[w_{ij}-w_{ij}[0]]$ is less than or equal to 0, if $\delta^-_{ij}$ is 0, the left side of the inequality (36) does not hold true. $\delta^-_{ij}$, therefore, must be 1 in this case. When $[w_{ij}-w_{ij}[0]]$ is 1 or more, on the other hand, if $\delta^-_{ij}$ is 1, the right side of the inequality (36) does not hold true. Therefore, $\delta^-_{ij}$ must be 0 in this case. This is expressed by the following equations (37) and (38).

$$w_{ij}-w_{ij}[0] \le 0 \Leftrightarrow \delta_{ij}^-=1 \quad (37)$$

$$w_{ij}-w_{ij}[0] \ge 1 \Leftrightarrow \delta_{ij}^-=0 \quad (38)$$

For the j-th server of the i-th rack, $z^-_{ij}$ is defined as an integer variable taking a value from 0 to $L_{ij}$. The following constraint is imposed on $z^-_{ij}$.

$$-L_{ij}\delta_{ij}^- \le z_{ij}^- \le L_{ij}\delta_{ij}^- \quad (39)$$

$$-(w_{ij}-w_{ij}[0])-L_{ij}(1-\delta_{ij}^-) \le z_{ij}^- \le -(w_{ij}-w_{ij}[0])+L_{ij}(1-\delta_{ij}^-) \quad (40)$$

When $[w_{ij}-w_{ij}[0]]$ is 1 or more, it follows from the above equation (38) that $\delta^-_{ij}$ is 0. Therefore, from the inequality (39), $[0 \le z^-_{ij} \le 0]$ results, which indicates that $z^-_{ij}$ is 0. When $[w_{ij}-w_{ij}[0] \ge 1, \delta^-_{ij}=0, z^-_{ij}=0]$ is satisfied, the above inequality (40) is reduced to $[-(w_{ij}-w_{ij}[0])+L_{ij} \ge 0 \ge -(w_{ij}-w_{ij}[0])-L_{ij}]$. Thus, the inequality (40) holds true. This is expressed by the following inequality (41).

$$w_{ij}-w_{ij}[0] \ge 1 \Rightarrow z_{ij}^-=0 \quad (41)$$

On the other hand, when $[w_{ij}-w_{ij}[0]]$ is 0 or less, it follows from the above equation (37) that $\delta^-_{ij}$ is 1. Therefore, from the inequality (40), $[-(w_{ij}-w_{ij}[0]) \le z^-_{ij} \le -(w_{ij}-w_{ij}[0])]$ results, which indicates that $z^-_{ij}$ is equivalent to $[-(w_{ij}-w_{ij}[0])]$.

When $[w_{ij}-w_{ij}[0] \le 0, \delta^-_{ij}=1, z^-_{ij}=-(w_{ij}-w_{ij}[0])]$ is satisfied, the above inequality (39) is reduced to $[-L_{ij} \le -(w_{ij}-w_{ij}[0]) \le L_{ij}]$. Thus, the inequality (39) holds true. This is expressed by the following inequality (42).

$$w_{ij}-w_{ij}[0] \le 0 \Rightarrow z_{ij}^-=-(w_{ij}-w_{ij}[0]) \quad (42)$$

$[w_{ij}-w_{ij}[0]]$ being 0 or less than means that a virtual machine is transferred from the j-th server in the i-th rack to a different server. $[w_{ij}-w_{ij}[0]]$ being 1 or more than means that a virtual machine is transferred from a certain server to the j-th server in the i-th rack. In other words, $z^-_{ij}$ represents the number of virtual machines that are transferred from the j-th server in the i-th rack to a different server.

Thus, power consumption in the case of transferring $z^-_{ij}$ virtual machines from the j-th server in the i-th rack to a different server is expressed by equation (43).

$$\gamma_{ij}^- z_{ij}^- \quad (43)$$

For the j-th server in the i-th rack, $\delta^+_{ij}$ is defined as a variable taking a value of 0 or 1. The following constraint is imposed on this variable $\delta^+_{ij}$.

$$\delta_{ij}^+ = 1 - \delta_{ij}^- \tag{44}$$

From the constraint of expression (44) and from expressions (37) and (38), the following inequalities (45) and (46) are obtained.

$$w_{ij} - w_{ij}[0] \leq 0 \Leftrightarrow \delta_{ij}^+ = 0 \tag{45}$$

$$w_{ij} - w_{ij}[0] \geq 1 \Leftrightarrow \delta_{ij}^+ = 1 \tag{46}$$

For the j-th server in the i-th rack, $z^+_{ij}$ is defined as an integer variable taking a value of 0 to $L_{ij}$. The following constraint is imposed on this variable $z^+_{ij}$.

$$-L_{ij}\delta_{ij}^+ \leq z_{ij}^+ \leq L_{ij}\delta_{ij}^+ \tag{47}$$

$$(w_{ij} - w_{ij}[0]) - L_{ij}(1 - \delta_{ij}^+) \leq z_{ij}^+ \leq (w_{ij} - w_{ij}[0]) + L_{ij}(1 - \delta_{ij}^+) \tag{48}$$

When $[w_{ij} - w_{ij}[0]]$ is 1 or more, from the inequality (46), $\delta_{ij}^+$ is 1. Therefore, the inequality (48) becomes $[w_{ij} - w_{ij}[0]] \leq z^+_{ij} \leq [w_{ij} - w_{ij}[0]]$. Thus, $z^+_{ij}$ is equivalent to $[w_{ij} - w_{ij}[0]]$.

When $[w_{ij} - w_{ij}[0]] \geq 1$, $\delta^+_{ij} = 1$, and $z^+_{ij} = [w_{ij} - w_{ij}[0]]$ are true, the inequality (47) is reduced to $[-L_{ij} \leq w_{ij} - w_{ij}[0] \leq L_{ij}]$. Therefore, the inequality (47) holds true. This is expressed by the following inequality (49).

$$w_{ij} - w_{ij}[0] \geq 1 \Rightarrow z_{ij}^+ = w_{ij} - w_{ij}[0] \tag{49}$$

On the other hand, when $[w_{ij} - w_{ij}[0]]$ is 0 less, it follows from the above equation (45) that $\delta^+_{ij}$ is 0. Therefore, from the inequality (47), $[0 \leq z^+_{ij} \leq 0]$ results, which indicates that $z^+_{ij}$ is 0. When $[w_{ij} - w_{ij}[0]] \leq 0$, $\delta^+_{ij} = 1$, $z^+_{ij} = 0$ is satisfied, the above inequality (48) is reduced to $[(w_{ij} - w_{ij}[0]) - L_{ij} \geq 0 \leq (w_{ij} - w_{ij}[0]) + L_{ij}]$. Thus, the inequality (48) holds true. This is expressed by the following inequality (50).

$$w_{ij} - w_{ij}[0] \leq 0 \Rightarrow z_{ij}^+ = 0 \tag{50}$$

$z^+_{ij}$ represents the number of virtual machines that are transferred from a certain server to the j-th server in the i-th rack. Thus, power consumption in the case of transferring $z^+_{ij}$ virtual machines from a certain server to the j-th server in the i-th rack is expressed by equation (51).

$$\gamma_{ij}^+ z_{ij}^+ \tag{51}$$

Power consumed through live migration is thus given by adding up the sums of power consumption in the case of transferring $z^-_{ij}$ virtual machines from the j-th server in the i-th rack to a different server and power consumption in the case of transferring $z^+_{ij}$ virtual machines from a certain server to the j-th server in the i-th rack, for all servers. Hence power consumed through live migration is expressed by equation (52).

$$\sum_{i=1}^{N} \sum_{j=1}^{S} \gamma_{ij}^- z_{ij}^- + \sum_{i=1}^{N} \sum_{j=1}^{S} \gamma_{ij}^+ z_{ij}^+ \tag{52}$$

A power-saving problem of saving power consumption by the servers and power supply units at execution of rearrangement of virtual machines can be formulated into an integer programming problem expressed by the following equations (53) to (67). Equation (53) represents an objective function and the equations (54) to (67) represent constraints. In these equations, $w_{ij}, v_{ij}, \delta^-_{ij}, \delta^+_{ij}, z^-_{ij}, z^+_{ij}, i=1,\ldots,N, j=1,\ldots,$ and $S$ denote coefficients of determination.

Minimize (53)

$$\sum_{i=1}^{N}\left(\eta_i + (1+\varepsilon_i)\sum_{j=1}^{S}(\beta_{ij}v_{ij} + \alpha_{ij}w_{ij})\right) +$$

$$c\left(\sum_{i=1}^{N}\sum_{j=1}^{S}\gamma_{ij}^- z_{ij}^- + \sum_{i=1}^{N}\sum_{j=1}^{S}\gamma_{ij}^+ z_{ij}^+\right)$$

$$w_{ij} \in \{0,1,\ldots,L_{ij}\}, i=1,\ldots,N, j=1,\ldots,S \tag{54}$$

$$v_{ij} \in \{0,1\}, i=1,\ldots,N, j=1,\ldots,S \tag{55}$$

$$\sum_{i=1}^{N}\sum_{j=1}^{S} w_{ij} = M := \sum_{i=1}^{N}\sum_{j=1}^{S} w_{ij}[0] \tag{56}$$

$$v_{ij} \leq w_{ij} \leq L_{ij}v_{ij}, i=1,\ldots,N, j=1,\ldots,S \tag{57}$$

$$\delta_{ij}^- \in \{0,1\}, i=1,\ldots,N, j=1,\ldots,S \tag{58}$$

$$d + (-L_{ij} - d)\delta_{ij}^- \leq w_{ij} - w_{ij}[0] \leq L_{ij}(1 - \delta_{ij}^-), \tag{59}$$
$$i=1,\ldots,N, j=1,\ldots,S$$

$$z_{ij}^- \in \{0,1,\ldots,L_{ij}\}, i=1,\ldots,N, j=1,\ldots,S \tag{60}$$

$$-L_{ij}\delta_{ij}^- \leq z_{ij}^- \leq L_{ij}\delta_{ij}^-, i=1,\ldots,N, j=1,\ldots,S \tag{61}$$

$$-(w_{ij} - w_{ij}[0]) - L_{ij}(1-\delta_{ij}^-) \leq z_{ij}^- \leq -(w_{ij} - w_{ij}[0]) + L_{ij}(1-\delta_{ij}^-), \tag{62}$$
$$i=1,\ldots,N, j=1,\ldots,S$$

$$\delta_{ij}^+ \in \{0,1\}, i=1,\ldots,N, j=1,\ldots,S \tag{63}$$

$$\delta_{ij}^+ = 1 - \delta_{ij}^-, i=1,\ldots,N, j=1,\ldots,S \tag{64}$$

$$z_{ij}^+ \in \{0,1,\ldots,L_{ij}\}, i=1,\ldots,N, j=1,\ldots,S \tag{65}$$

$$-L_{ij}\delta_{ij}^+ \leq z_{ij}^+ \leq L_{ij}\delta_{ij}^+, i=1,\ldots,N, j=1,\ldots,S \tag{66}$$

$$(w_{ij} - w_{ij}[0]) - L_{ij}(1-\delta_{ij}^+) \leq z_{ij}^+ \leq (w_{ij} - w_{ij}[0]) + L_{ij}(1-\delta_{ij}^+), \tag{67}$$
$$i=1,\ldots,N, j=1,\ldots,S$$

Formulation into Integer Programming Problem by Combining Together Noise Suppression Problem and Power-Saving Problem A power-saving problem and a noise suppression problem can be formulated into an integer programming problem by combining together an objective function of the power-saving problem and an objective function of the noise suppression problem described in the second embodiment, for each among initial arrangement of virtual machines, additional arrangement of virtual machines, and rearrangement of virtual machines.

The computer system 1 has data of the number of racks and the number of servers per rack depicted in FIG. 15, the number of virtual machines depicted in FIG. 5, and the maximum number of virtual machines that can be executed depicted in FIG. 17, as data common to the noise suppression problem and the energy-saving problem. The computer system 1 also has data of the noise propagation attenuation constant depicted in FIG. 7, the noise source acoustic power depicted in FIG. 8, and the base noise source acoustic power depicted in FIG. 9, as data of the noise suppression problem.

The computer system 1 also has data of the scaling factor depicted in FIG. 16, the power consumption by virtual machines depicted in FIG. 18, and the base power consumption depicted in FIG. 19, as data of the power-saving problem. The computer system 1 also has data of the power consumption by the virtual machine transfer origin depicted in FIG. 20, the power consumption by the virtual machine transfer destination depicted in FIG. 21, and the base power consumption by the power supply unit and the coefficient of proportionality depicted in FIG. 23, as data of the power-saving problem.

The index i in the second embodiment and the same in the third embodiment are different in meaning from each other. For explanation of the noise suppression problem in the third embodiment, therefore, an index k is used in place of the index i. The relation between the index k of the third embodiment and the index i of the second embodiment is [k=S(i−1)+j].

(1) Initial Arrangement of Virtual Machines

A noise suppression problem and a power-saving problem at execution of initial arrangement of virtual machines can be formulated into an integer programming problem expressed by equation (68) and the above equations (26) to (29). Equation (68) represents an objective function and the equations (26) to (29) represent constraints. In these equations, $w_{ij}$, $v_{ij}$, i=1, ..., N, j=1, ..., and S denote coefficients of determination.

Minimize (68)

$$\sum_{i=1}^{N}\left(\eta_i+(1+\varepsilon_i)\sum_{j=1}^{S}(\beta_{ij}v_{ij}+\alpha_{ij}w_{ij})\right)+\rho\sum_{i=1}^{N}\sum_{i=1}^{S}C_k(\kappa_k v_k+\lambda_k w_k)$$

(2) Additional Arrangement of Virtual Machines

A noise suppression problem and a power-saving problem at execution of additional arrangement of virtual machines can be formulated into an integer programming problem expressed by equation (68) and the above equations (32) to (35). Equation (68) represents an objective function and the equations (32) to (35) represent constraints. In these equations, $w_{ij}$, $v_{ij}$, i=1, ..., N, j=1, ..., and S denote coefficients of determination.

(2) Rearrangement of Virtual Machines

A noise suppression problem and a power-saving problem at execution of rearrangement of virtual machines can be formulated into an integer programming problem expressed by equation (69) and the above equations (54) to (67). Equation (69) represents an objective function and the equations (54) to (67) represent constraints. In these equations, $w_{ij}$, $v_{ij}$, $\delta^-_{ij}$, $\delta^+_{ij}$, $z^-_{ij}$, $z^+_{ij}$, i=1, ..., N, j=1, ..., and S denote coefficients of determination.

Minimize (69)

$$\sum_{i=1}^{N}\left(\eta_i+(1+\varepsilon_i)\sum_{j=1}^{S}(\beta_{ij}v_{ij}+\alpha_{ij}w_{ij})\right)+$$

$$c\left(\sum_{i=1}^{N}\sum_{j=1}^{S}\gamma^-_{ij}z^-_{ij}+\sum_{i=1}^{N}\sum_{j=1}^{S}\gamma^+_{ij}z^+_{ij}\right)+\rho\sum_{i=1}^{N}\sum_{i=1}^{S}C_k(\kappa_k v_k+\lambda_k w_k)$$

FIG. 24 is a flowchart of the virtual machine arranging method of the third embodiment. As depicted in FIG. 24, when virtual machine arrangement is started, the determining unit 31 of the controller 4 determines which type of virtual machine arrangement is started: initial arrangement, additional arrangement, or rearrangement (step S11). Based on the result of the determination, the determining unit 31 sends an instruction indicative of the type of arrangement to the solution obtaining unit 34.

The storing unit 32 then inputs data (constant), a variable, an objective function, and a constraint to the solution obtaining unit 34 (step S12). Based on the input data (constant), variable, objective function, and constraint and the instruction from the determining unit 31, the solution obtaining unit 34 solves an integer programming problem by, for example, a solver to find a solution (step S13). Formulation into an integer programming problem will be described later for each type of arrangement. The arranging unit 35 arranges virtual machines, based on the solution obtained by the solution obtaining unit 34 (step S14). Thus, a series of steps of virtual machine arrangement comes to an end.

According to the third embodiment, virtual machine arrangement that simultaneously realizes power-saving at the data center and noise suppression at the evaluation point 43 can be determined. Therefore, power consumption by the data center and noise at the evaluation point 43 can be reduced.

FIG. 25 is a diagram of an example of arrangement of virtual machines in the first to third embodiments. As depicted in FIG. 25, at initial arrangement positions 51 of virtual machines, virtual machines 53 are arranged uniformly in, for example, each rack 5 in the data center 52. This is not the arrangement for which the size of noise at the evaluation point 43 is taken into consideration. In contrast, at post-rearrangement positions 54 of virtual machines resulting from rearrangement of virtual machines for reducing noise at the evaluation point 43 according to the first to third embodiments, the virtual machines 53 are arranged in, for example, servers 2 away from the evaluation point 43 in the data center 52. As a result, noise at the evaluation point is reduced.

A computer system and a virtual machine arranging method offer an effect of reducing noise at an evaluation point when multiple virtual machines are assigned to multiple servers.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A computer system comprising:
a plurality of servers having virtual machines arranged therein;
a noise source in each among the plurality of servers, the noise source emitting sound when the server is operated; and
a controller that controls arrangement of the virtual machines in the plurality of servers, wherein
the controller solves an integer programming problem having an objective function representing a noise contribution described as any one among a function of virtual machine arrangement and a function of a job assignment count and indicating an extent of contribution of the sound emitted from the noise source to a noise volume at an evaluation point, by executing software for solving the integer programming problem on a processor, and based on a solution to the integer programming problem, causes the processor to arrange the virtual machines in the plurality of servers via an interface for the plurality of servers.

2. The computer system according to claim 1, wherein
the noise contribution is defined by a function of a noise propagation attenuation constant defining a rate of attenuation of the sound propagating from the noise source to the evaluation point and noise source acoustic power,
the noise propagation attenuation constant is derived by acoustic analysis, and
the noise source acoustic power is described as any one among a function of the virtual machine arrangement and a function of the job assignment count.

3. The computer system according to claim 1, further comprising a plurality of power supply units that supply power to the plurality of servers, wherein
the controller defines the objective function as a sum of total power consumption representing a total of power consumption by the plurality of servers and power consumption by the plurality of power supply units and the noise contribution, the sum being described as any one among a function of the virtual machine arrangement and a function of the job assignment count.

4. A virtual machine arranging method executed when virtual machines are arranged in a plurality of servers each having a noise source that emits sound when the server is operated, the method comprising:
solving an integer programming problem having an objective function representing a noise contribution described as any one among a function of virtual machine arrangement and a function of a job assignment count and indicating an extent of contribution of the sound emitted from the noise source to a noise volume at an evaluation point; and
arranging the virtual machines based on a solution to the integer programming problem.

5. The virtual machine arranging method according to claim 4, comprising:
defining the noise contribution by a function of a noise propagation attenuation constant defining a rate of attenuation of the sound propagating from the noise source to the evaluation point and noise source acoustic power;
deriving the noise propagation attenuation constant by acoustic analysis; and
describing the noise source acoustic power as any one among a function of the virtual machine arrangement and a function of the job assignment count.

6. The virtual machine arranging method according to claim 5, comprising:
performing acoustic analysis of interior of the plurality of servers using a statistic energy analysis; and
performing acoustic analysis of exterior of the plurality of servers using a sound-ray tracing technique.

7. The virtual machine arranging method according to claim 4, wherein
the objective function is defined as a sum of total power consumption representing a total of power consumption by the plurality of servers and power consumption by a plurality of power supply units that supply power to the plurality of servers and the noise contribution, the sum being described as any one among a function of the virtual machine arrangement and a function of the job assignment count.

\* \* \* \* \*